(12) United States Patent
Muraki

(10) Patent No.: US 11,623,680 B2
(45) Date of Patent: Apr. 11, 2023

(54) STEERING DEVICE

(71) Applicant: AISIN CORPORATION, Aichi (JP)

(72) Inventor: Toshihiro Muraki, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/693,481

(22) Filed: Mar. 14, 2022

(65) Prior Publication Data

US 2022/0306183 A1 Sep. 29, 2022

(30) Foreign Application Priority Data

Mar. 29, 2021 (JP) .............................. JP2021-055477

(51) Int. Cl.
*B62D 1/19* (2006.01)
*B62D 1/185* (2006.01)

(52) U.S. Cl.
CPC ............. *B62D 1/195* (2013.01); *B62D 1/185* (2013.01)

(58) Field of Classification Search
CPC ........ B62D 1/195; B62D 1/185; B62D 1/192; B62D 1/181
See application file for complete search history.

(56) References Cited

U.S. PATENT DOCUMENTS

| | | | |
|---|---|---|---|
| 10,919,561 B2* | 2/2021 | Sekiguchi | B62D 1/185 |
| 10,953,910 B2* | 3/2021 | Sekiguchi | B62D 1/192 |
| 10,953,911 B2* | 3/2021 | Sekiguchi | B62D 1/185 |
| 2007/0194563 A1* | 8/2007 | Menjak | B62D 1/195 |
| | | | 280/777 |
| 2019/0100230 A1* | 4/2019 | Messing | B62D 1/195 |
| 2019/0126968 A1* | 5/2019 | Messing | B62D 1/181 |
| 2019/0225255 A1 | 7/2019 | Ishimura et al. | |

FOREIGN PATENT DOCUMENTS

JP 2019127176 A 8/2019

* cited by examiner

*Primary Examiner* — Drew J Brown
(74) *Attorney, Agent, or Firm* — Buchanan Ingersoll & Rooney PC

(57) ABSTRACT

A steering device includes: an inner tube including a steering wheel; a column housing that houses the tube retractably along an axis; a drive mechanism attached to the column housing in such a way as to cause the tube to perform a retraction operation via a drive member that reciprocates along the axis, a first impact absorption member that is provided on one of the drive member and the tube, and includes a deformation portion; and an action member that is provided on another of the drive member and the tube, and plastically deforms the deformation portion. The drive member, the first impact absorption member, and the action member are fixed by a single fixing member. When a predetermined pushing load acts on the tube, fixing between the first impact absorption member and the action member is released.

7 Claims, 4 Drawing Sheets

STEERING DEVICE

CROSS REFERENCE TO RELATED APPLICATIONS

This application is based on and claims priority under 35 U.S.C. § 119 to Japanese Patent Application 2021-055477, filed on Mar. 29, 2021, the entire content of which is incorporated herein by reference.

TECHNICAL FIELD

This disclosure generally relates to a steering device including an impact absorption member between an inner tube to which a steering wheel is attached and a column housing that holds the inner tube retractably.

BACKGROUND DISCUSSION

Conventionally, there is a technique disclosed in, for example, JP2019-127176A (Reference 1) as such a steering device (see paragraphs [0006] to [0007] and [0043], and FIGS. 2, 6, and 7).

This technique includes: a steering shaft including a base end portion rotatably supported by a housing and a tip portion that can rotate integrally with the base end portion and can expand and contract; a support member that rotatably includes the tip portion, is supported by the housing in such a way as to expand and contract integrally with the tip portion, and has a tubular shape; a movable member that expands, contracts, and moves with respect to the housing by motor drive; and an energy absorption member attached across the movable member and the support member.

The energy absorption member is, for example, a member having a U-shape, has one end portion fixed to a wall portion of the support member by a screw and the like, and has another end portion fixed to the movable member similarly by a screw and the like. The energy absorption member has rigidity for transmitting drive force of a motor from the movable member to the support member, and moving the support member.

In this way, drive force transmitted from the movable member to the support member passes through the energy absorption member during normal expansion-contraction movement of the support member. On the other hand, when pushing impact force acts on the steering shaft, a U-shaped portion of the energy absorption member successively becomes deformed due to pushing of the support member, and absorbs impact energy.

In the prior art of this configuration, the energy absorption member serves as a component that moves the support member for expanding and contracting the steering shaft during expansion-contraction adjustment and also serves as a component that reduces an impact applied to the support member. Thus, the number of parts of the steering device is reduced, and an impact absorption structure is simplified.

In the conventional steering device described above, drive force related to the expansion-contraction adjustment of the support member is performed via the energy absorption member. Thus, as rigidity that needs to be provided in the energy absorption member, rigidity being able to oppose frictional force and the like acting on the support member upon the expansion-contraction adjustment of the support member needs to be provided.

Further, during a normal operation, external force into an expansion-contraction direction acts on the steering shaft from a steering wheel or the like. At this time, when the support member unexpectedly expands and contracts, a sense of steering lacks in rigidity, which is not preferable. Thus, a member having rigidity in such a way as not to be easily bent and deformed needs to be adopted as the energy absorption member.

In this way, in the conventional steering device, rigidity setting of the energy absorption member is restricted, and a lower limit value occurs in load setting as a collision safety mechanism.

Further, since the energy absorption member is a drive force transmission member, both end portions thereof need to be each coupled to the movable member and the support member. Thus, even when a cost is desired to be reduced, there is a limit due to not only a complicated coupling structure but also an increase in fastening parts, an increase in time and effort for a coupling operation, and the like.

A need thus exists for a steering device which is not susceptible to the drawback mentioned above.

SUMMARY

A steering device according to this disclosure includes an inner tube having an end portion to which a steering wheel of a vehicle is attached, a column housing that houses the inner tube retractably along an axis of the inner tube, a drive mechanism that is attached to the column housing, and causes the inner tube to perform a retraction operation via a drive member that reciprocates along the axis, a first impact absorption member that is integrally provided on one of the drive member and the inner tube, and includes a deformation portion, and an action member that is provided on another of the drive member and the inner tube, acts on the deformation portion, and plastically deforms the deformation portion. The drive member, the first impact absorption member, and the action member are fixed to one another by a single fixing member. When a predetermined pushing load along the axis acts on the inner tube, fixing between the first impact absorption member and the action member is released.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

"Outline"

An example of a steering device S according to this disclosure is illustrated in FIGS. 1 to 4. The steering device S includes an inner tube 1 to which a steering wheel H is attached, and a column housing 2 that holds the inner tube 1 retractably along an axis X of the inner tube 1. In order to perform a retractable operation, a drive mechanism K is provided across the column housing 2 and the inner tube 1.

A first impact absorption member 3 is provided between the inner tube 1 and the column housing 2. The first impact absorption member 3 plastically becomes deformed when a predetermined load in a pushing direction acts on the inner tube 1, absorbs energy, and suppresses strong opposing force being received by a driver from the inner tube 1. Each embodiment of the steering device S according to this disclosure will be described below with reference to each drawing.

(Drive Mechanism)

Figure 1:
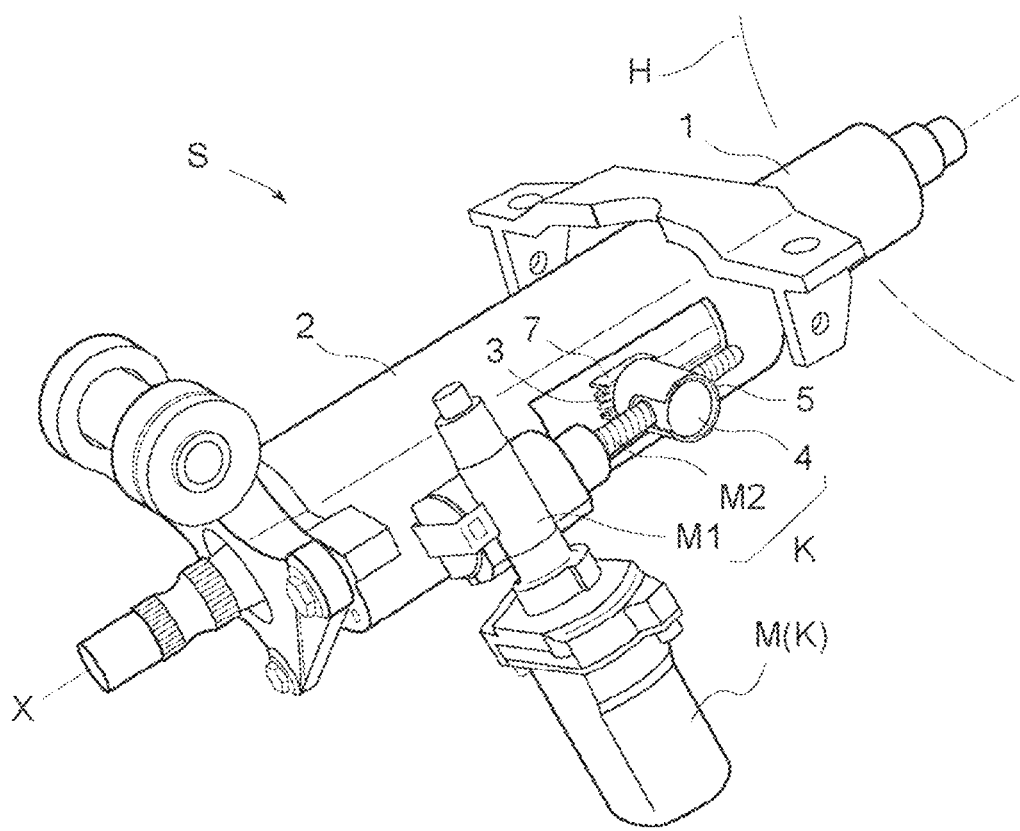
FIG. 1 is a perspective view illustrating an external configuration of a steering device.
Figure 2:
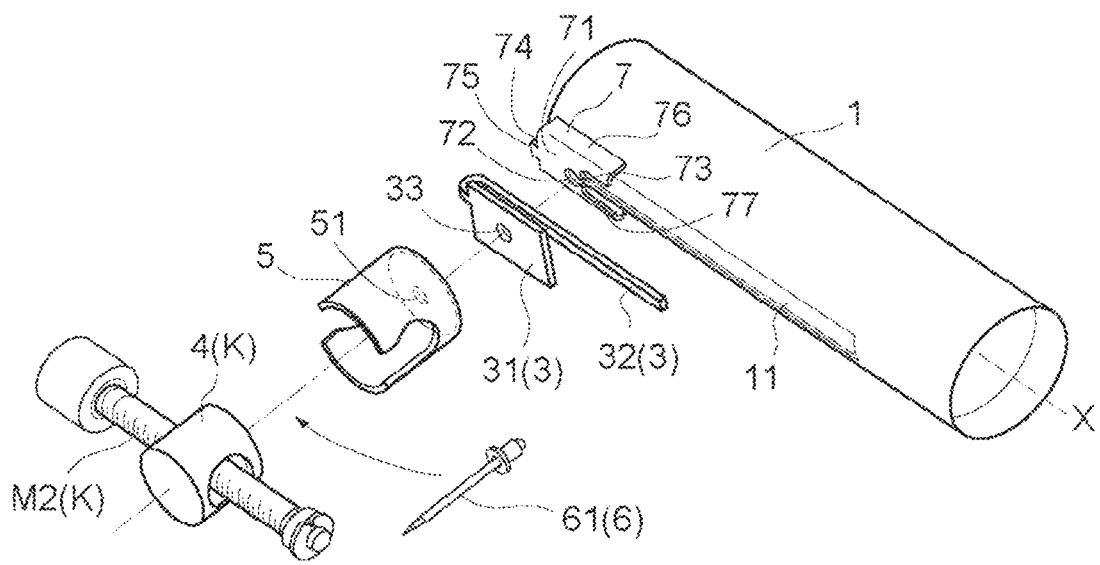
FIG. 2 is an exploded perspective view illustrating an attachment aspect of a first impact absorption member according to a first embodiment.

As illustrated in FIG. 2, the drive mechanism K is formed of a motor M, a screw M2 that meshes with an output shaft M1 of the motor M, and a top member 4 screwed to the screw M2. The motor M is provided on the column housing 2, and rotates in forward and reverse directions by an operation of a driver of a vehicle, and thus a retraction position of the inner tube 1 is determined. Although not illustrated, the screw M2 is connected to the output shaft M1 of the motor M in such a way as to be integrally rotatable.

A retainer 5 fits with the top member 4, and both of them function as a drive member that reciprocates along the axis X. The retainer 5 is, for example, a cup-shaped member having a substantially cylindrical shape. A hole 51 through which, for example, a rivet 61 as a fixing member 6 is inserted is formed in a bottom portion of the retainer 5. The retainer 5 fits with the top member 4 in a direction orthogonal to a longitudinal direction of the screw M2, and both of them are integrally movable.

(Action Member)

As illustrated in FIG. 2, an action member 7 having a substantially box shape is attached to an outer surface of an end portion of the inner tube 1, for example. The action member 7 is always fixed integrally with the drive mechanism K by the fixing member 6 described below, and, when a predetermined load in the pushing direction acts on the inner tube 1, a squeeze portion 74 provided on a part of the action member 7 plastically deforms the first impact absorption member 3.

Fastening force of the fixing member 6 acts on the action member 7. The action member 7 formed separately from the inner tube 1 may be attached to the inner tube 1 by a screw, welding, or the like, or the action member 7 may be formed integrally with the inner tube 1 from the start by injection molding, casting, or the like. FIG. 2 illustrates an example in which the action member 7 is formed integrally with the inner tube 1.

A notch hole 72 through which the fixing member 6 is inserted is formed in a flat portion 71 of the action member 7 separated from a surface of the inner tube 1. The notch hole 72 is not a complete annular hole, and has a notch 73 in a part thereof. The notch 73 is open to a tip side along the axis X of the inner tube 1. The notch 73 is a first fragile portion when the action member 7 holds the fixing member 6. As described below, when the inner tube 1 receives impact force having equal to or greater than a predetermined value in the pushing direction, the notch 73 opens and becomes deformed, and the notch hole 72 comes off the fixing member 6. In this way, the inner tube 1 can move toward a back side of the column housing 2. A diameter of the notch hole 72 is formed in a size that, for example, does not generate a gap between an outer surface of the rivet 61 being the fixing member 6 and the notch hole 72.

When the first fragile portion by such notch hole 72 and notch 73 is provided, there are a plurality of elements that can be designed, such as a thickness of the action member 7, a width of the notch 73, and an inside diameter of the notch hole 72, for a shape design of the notch 73. Moreover, since it is also relatively easy to set any element, the first fragile portion can be designed according to a vehicle to be equipped.

Note that, by setting a board thickness of the action member 7, an inside diameter of the notch hole 72, a width dimension of the notch 73, and the like as appropriate, a load for the notch hole 72 to exit from the fixing member 6 can be set. Thus, an impact absorption characteristic of the first impact absorption member 3 can be set together with a plastic deformation capacity of a deformation portion 32 of the first impact absorption member 3. Providing such a first fragile portion on the action member 7 does not require complicated processing and the like, and it is also relatively easy to set any element. Thus, it is easy to design the first fragile portion according to a vehicle to be equipped. Note that a target on which the first fragile portion such as the notch hole 72 is formed may be the retainer 5 according to an installation aspect of the first impact absorption member 3, and can be changed as appropriate.

(First Impact Absorption Member)

The first impact absorption member 3 is disposed between the retainer 5 and the action member 7. As illustrated in FIG. 2, the first impact absorption member 3 includes, for example, a main body portion 31 having a plate shape, and the deformation portion 32 that extends from the main body portion 31, is bent in such a way as to be parallel to the main body portion 31, and has an elongated shape.

A hole 33 through which the fixing member 6 passes is formed in the main body portion 31. A periphery of the hole 33 is sandwiched between a bottom surface of the retainer 5 and an outer surface of the flat portion 71 of the action member 7. The deformation portion 32 is provided in a position deviated from the hole 33 in order to avoid interference with the fixing member 6 passing through the hole 33.

Figure 3A:
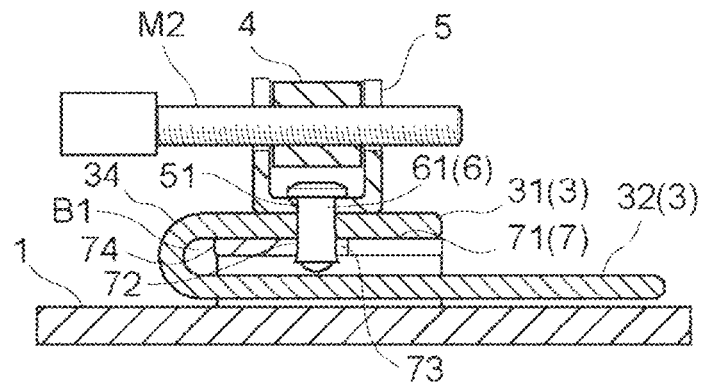
FIGS. 3A to 3C are explanatory views illustrating a function exhibition aspect of the first impact absorption member.

A state where the first impact absorption member 3 is fixed by the fixing member 6 is illustrated in FIG. 3. Particularly, as illustrated in FIG. 3A, the deformation portion 32 is attached in a state of passing through a rear side of the flat portion 71 of the action member 7. By such an arrangement, when the inner tube 1 is pushed by impact force, the squeeze portion 74 provided on an end portion of the action member 7 abuts a bent portion 34 of the deformation portion 32 and also presses the bent portion 34 to the back side along the direction of the axis X. The deformation portion 32 is squeezed by the pressing, and the bent portion 34 successively moves to the tip side of the deformation portion 32. In this way, energy of the impact is absorbed.

In this embodiment, upon a retraction operation in a normal use of the inner tube 1, the deformation portion 32 does not transmit drive force. Thus, load setting of the deformation portion 32 in order to conform to a normal use does not need to be performed. The deformation portion 32 may become deformed only when the deformation portion 32 receives an impact load, thereby facilitating expected deformation load setting.

As illustrated in FIG. 2, a protrusion 75 that protrudes in the direction of the axis X is provided adjacent to the squeeze portion 74 of the action member 7. The protrusion 75 causes the deformation portion 32 becoming deformed to abut the squeeze portion 74 of the action member 7 all the time. The deformation portion 32 is sandwiched between the protrusion 75 and a side surface 76 of the action member 7, and a posture during deformation becomes stable. As a result, a load required for deformation becomes an expected load, and an appropriate energy absorption function is exhibited.

(Fixing Member)

In this embodiment, the rivet 61 is used as the fixing member 6. As the rivet 61, in addition to a normal blind rivet, a hollow rivet, furthermore, a solid countersunk rivet, and the like can be used. Particularly, a blind rivet can easily perform fastening by, for example, placing the first impact absorption member 3 and the retainer 5 on the action member 7 and inserting the blind rivet from the hole 51 of the retainer 5.

Note that, since the protrusion 75 is formed on the action member 7 in this embodiment, the first impact absorption member 3 can be temporarily fixed by hanging the deformation portion 32 on the protrusion 75 during assembly. Thus, a rivet operation is easier.

Further, since the rivet 61 itself is a small member, a space volume occupied by a connection portion of the drive mechanism K and the inner tube 1 is also small. A manufacturing cost is also inexpensive by using the rivet 61. Thus, an application range of the steering device S to which the first impact absorption member 3 having this configuration can be attached can be extended.

Note that, in addition to the rivet 61, various screw members and bolts can also be used as the fixing member 6, and any member can be used as long as the action member 7, the first impact absorption member 3, and the retainer 5 can be reliably fastened.

As described above, in the steering device S according to this embodiment, the retainer 5, the first impact absorption member 3, and the action member 7 are fixed by the single fixing member 6. Thus, the number of the fixing member 6 is the smallest, a structure is simple, and assemblability is excellent.

Particularly, the retainer 5 and the action member 7 are fixed by the fixing member 6 while sandwiching the first impact absorption member 3, and thus bending rigidity of the first impact absorption member 3 is not used when the inner tube 1 performs a retraction operation in a normal use. Thus, a sense of unity of the column housing 2 and the inner tube 1 can improve, and the steering device S having high rigidity can be acquired.

(Function Aspect of First Impact Absorption Member)

Figure 3B:
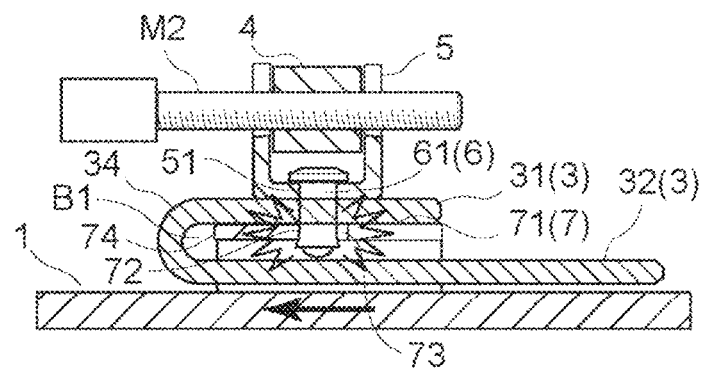
Figure 3C:
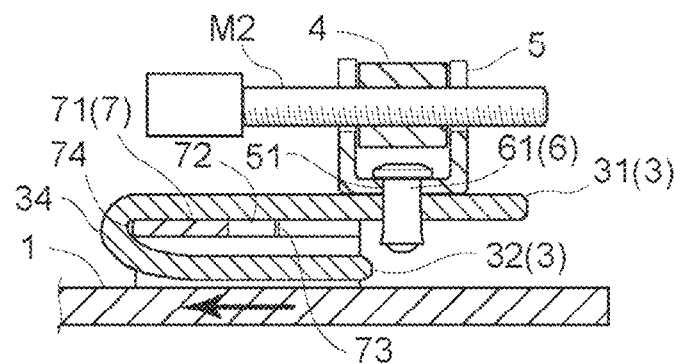

A function aspect of the first impact absorption member 3 when the inner tube 1 receives an impact load in the pushing direction is illustrated in FIGS. 3A to 3C. As described above, FIG. 3A illustrates a state where the first impact absorption member 3 is sandwiched between and fixed to the action member 7 and the retainer 5 by using the fixing member 6.

Figure 4:
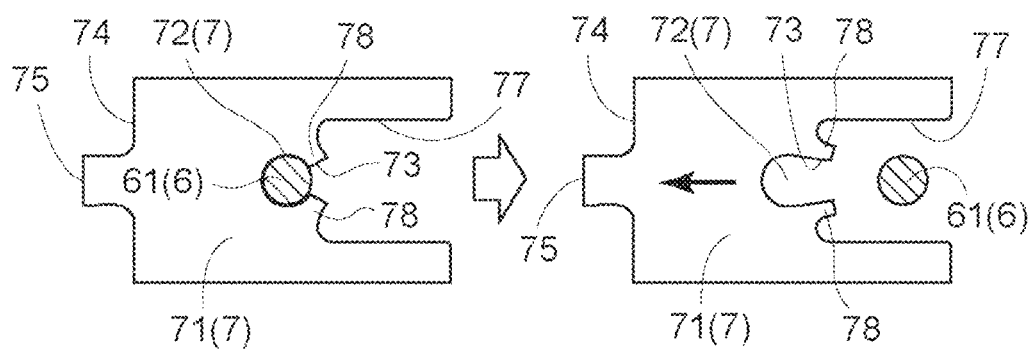
FIG. 4 is an explanatory view illustrating a function exhibition aspect of the first impact absorption member.

FIG. 3B illustrates a state where impact force acts on the inner tube 1, and the notch hole 72 comes off the rivet 61. Herein, details of the notch hole 72 are illustrated in FIG. 4. The notch hole 72 is formed in a state of opening to a recessed portion 77 formed in one side of the flat portion 71 while the notch hole 72 has the notch 73 formed in a part thereof. Two regions constituting the notch 73 are each formed as a protruding portion 78 located between the recessed portion 77 and the notch hole 72 and protruding from both. With the shape, the protruding portion 78 is bent and becomes deformed easily from a base end portion, thereby facilitating setting a load for exiting from the rivet 61.

FIG. 3C is a state where the action member 7 coming off the rivet 61, and the inner tube 1 move while squeezing and deforming the deformation portion 32. At this time, the action member 7 exits from the rivet 61, and thus fastening pressure of the rivet 61 decreases. Thus, there is a possibility that the retainer 5 and the main body portion 31 of the first impact absorption member 3 in FIG. 3C may relatively move along the movement direction of the inner tube 1. However, the rivet 61 closely fits with the retainer 5 and the main body portion 31, the retainer 5 and the first impact absorption member 3 are not separated, and squeezing and deformation of the deformation portion 32 by the action member 7 are appropriately performed.

For installation of the action member 7 and the first impact absorption member 3, a first gap B1 may be formed between the squeeze portion 74 provided on the end portion of the action member 7 and the deformation portion 32 in a state where a predetermined pushing load does not act on the inner tube 1.

By providing the first gap B1 between the squeeze portion 74 and the deformation portion 32, when a predetermined pushing load acts on the inner tube 1, a timing at which the notch 73 being the first fragile portion becomes deformed and a timing at which the deformation portion 32 subsequently becomes deformed can be set different. Specifically, the notch 73 first functions, and fixing between the action member 7 and the first impact absorption member 3 is released. At this time, a certain amount of energy is absorbed while the action member 7 and the first impact absorption member 3 are relatively displaced. Next, the squeeze portion 74 acts on the deformation portion 32, the deformation portion 32 becomes bent and deformed, and the energy is further absorbed.

If both of the impact absorption functions occur simultaneously, a threshold value of energy needed for starting movement of the inner tube 1 becomes a total of energy of both and becomes excessive. However, by providing a time difference in exhibition of the impact absorption functions between the notch 73 and the deformation portion 32, a threshold value of energy needed for starting pushing movement of the inner tube 1 at each timing is reduced, and the pushing movement of the inner tube 1 successively occurs. As a result, instantaneous opposing force being received by a passenger from the steering wheel H is reduced, and the safer steering device S can be acquired.

Note that, as illustrated in FIG. 2, a groove portion 11 is formed in an outer surface of the inner tube 1 in such a way that an end portion of the rivet 61 does not abut the outer surface of the inner tube 1. In other words, when the inner tube 1 moves in a state where the action member 7 is separated from the retainer 5 and the first impact absorption member 3, there is a possibility that the screw M2 of the motor M may be bent, and the retainer 5 and the first impact absorption member 3 may approach the inner tube 1. Thus, providing the groove portion 11 prevents the pushing operation from being hampered due to interference of the inner tube 1 with a head portion of the rivet 61.

Second Embodiment

Figure 5:
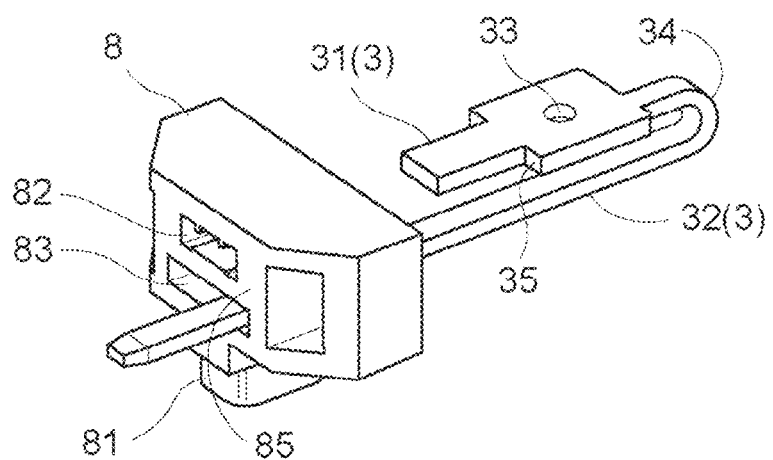
FIG. 5 is a perspective view illustrating a configuration of a second impact absorption member according to a second embodiment.

FIGS. 5 and 6 illustrate an example in which a second impact absorption member 8 is provided between a member on a side of a column housing 2 that relatively moves when an impact load is received, and a member on a side of an inner tube 1. With this configuration, energy for destruction of the second impact absorption member 8 can be added to energy for a notch hole 72 to come off a rivet 61 being a fixing member 6, and an impact absorption capacity of the inner tube 1 can be further increased.

For example, the second impact absorption member 8 is fixed to the inner tube 1 by a fitting portion 81, and is fixed, by an insertion portion 82, to a first impact absorption member 3 being the member on the column housing 2 side. Note that the member on the column housing 2 side may be a retainer 5, and the member on the inner tube 1 side may be an action member 7.

FIGS. 5 and 6 illustrate an external shape of the second impact absorption member 8. In this embodiment, a protruding portion that engages with an engagement hole 12 of the inner tube 1 is integrally formed as the fitting portion 81, and a hole in which a main body portion 31 of the first impact absorption member 3 is inserted and fits is formed as the insertion portion 82. An insertion hole 83 in which a deformation portion 32 is inserted and disposed is provided in a position adjacent to the insertion portion 82. One outer surface of the second impact absorption member 8 is, for example, an abutment portion 85 that abuts a reception portion 35 provided on a part of the first impact absorption member 3.

When the inner tube 1 receives a pushing load, the load is transmitted from the inner tube 1 to the second impact absorption member 8 via the fitting portion 81, and the load is further transmitted from the abutment portion 85 to the reception portion 35 of the first impact absorption member 3. At this time, the fitting portion 81 or the abutment portion 85 is destroyed, and thus a part of the pushing load of the inner tube 1 is absorbed by the second impact absorption member 8.

For attachment of the second impact absorption member 8, first, the fitting portion 81 fits into the engagement hole 12 of the inner tube 1, and the main body portion 31 is inserted into the insertion portion 82 while the deformation portion 32 of the first impact absorption member 3 is inserted through the inside of the action member 7 and the insertion hole 83. Meanwhile, the retainer 5 is positioned, and, for example, fastens the rivet 61 from the retainer 5 side. The second impact absorption member 8 is formed of, for example, a resin material. When predetermined impact force acts on the inner tube 1, the fitting portion 81 is to be cut.

Figure 6A:
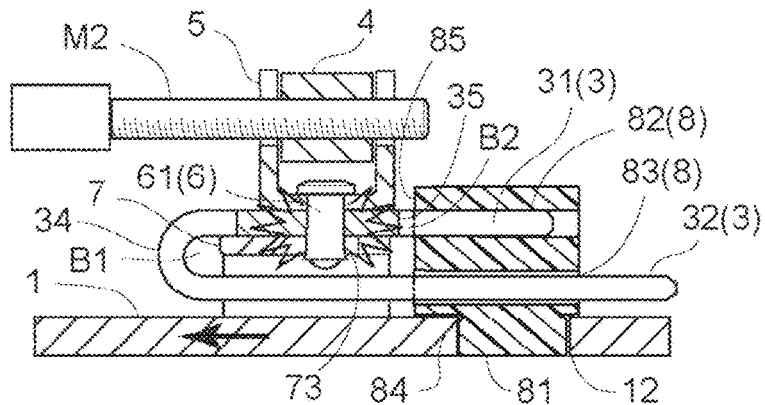
FIGS. 6A to 6D are explanatory views illustrating a function exhibition aspect of the second impact absorption member according to the second embodiment.

FIG. 6A illustrates a state where the second impact absorption member 8 is attached. A small diameter portion 84 having a slightly small outside diameter formed is provided on a base end portion of the fitting portion 81. The small diameter portion 84 functions as a second fragile portion. In other words, when predetermined impact force acts on the inner tube 1, the small diameter portion 84 reliably ruptures in a position of the small diameter portion 84, and absorbs a fixed amount of energy.

As illustrated in FIG. 6A, for the attachment of the second impact absorption member 8, a second gap B2 is provided between the abutment portion 85 and the reception portion 35 of the first impact absorption member 3. In this way, when predetermined impact force acts on the inner tube 1, first, energy is absorbed in a notch 73 being a first fragile portion, the inner tube 1 is then moved by a predetermined distance, the abutment portion 85 and the reception portion 35 abut each other, and the small diameter portion 84 ruptures. In other words, by dividing occurrence timings of the impact absorption functions, a threshold value of energy for starting the movement of the inner tube 1 at each timing is reduced, and the start of the movement of the inner tube 1 is facilitated. In this way, while increasing a total amount of energy absorption of the portion that exhibits each impact absorption function, instantaneous opposing force being received by a passenger from a steering wheel H can be reduced.

Figure 6B:
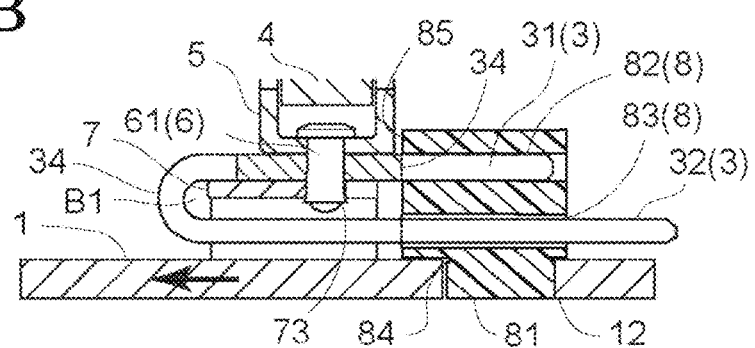
Figure 6C:
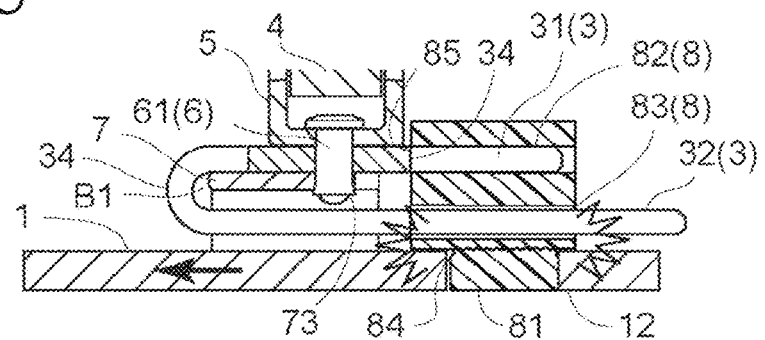

Particularly, in this embodiment, by setting a rupture load on the second impact absorption member 8 as appropriate, all of the timings at which the impact absorption functions of the notch 73, the fitting portion 81, and the deformation portion 32 are exhibited are set different. For example, as illustrated in FIG. 6A, when the inner tube 1 receives impact force, first, energy absorption is performed by deformation of the notch 73. Herein, when the notch 73 becomes deformed and the inner tube 1 moves, the second impact absorption member 8 then moves by abutment between the engagement hole 12 and the fitting portion 81. Subsequently, as illustrated in FIG. 6B, the second gap B2 is eliminated, and the abutment portion 85 abuts the reception portion 35 of the first impact absorption member 3. As illustrated in FIG. 6C, by further pushing of the inner tube 1, the small diameter portion 84 of the fitting portion 81 ruptures, and a part of energy of the impact force is absorbed.

Figure 6D:
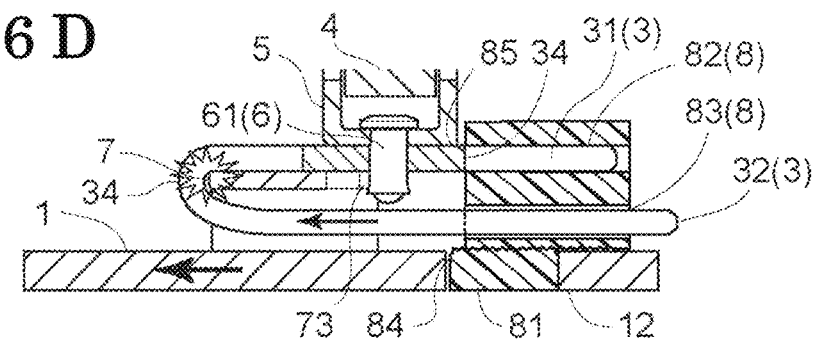

As illustrated in FIG. 6D, when the inner tube 1 is further pushed, a first gap B1 between a squeeze portion 74 of the action member 7 and the deformation portion 32 is eliminated, and energy absorption by squeezing and deformation of the deformation portion 32 is performed. In this way, with this configuration, instantaneous opposing force from the steering wheel H is small, and a safer steering device S having a great total amount of energy absorption can be acquired.

Other Embodiment

As a method for the fixing member 6 and the action member 7 to come off each other, the fixing member 6 itself may be cut and destroyed by the action member 7. In this case, for example, only a portion into which the action member 7 is inserted may have a small diameter, or a notch may be provided in advance in a portion located on a boundary between the action member 7 and the first impact absorption member 3. Any configuration may be used as long as fixing of the action member 7 is released, and the first impact absorption member 3 is reliably left on a drive portion side when the inner tube 1 and the action member 7 are pushed on impact.

In this way, with the configuration in which the fixing member 6 is cut, a circular hole through which the fixing member 6 can be inserted may simply be formed in the action member 7, thereby simplifying a component part.

As the first impact absorption member 3, a wire formed of various materials can be used. In this case, by setting a local bending radius of the wire in addition to setting tensile strength of the wire as appropriate, a configuration for exhibiting necessary bending resistance can also be achieved. Even when a wire is used, the steering device S requiring a small installation space, being compact, and having excellent mountability can be acquired.

A steering device according to this disclosure includes an inner tube having an end portion to which a steering wheel of a vehicle is attached, a column housing that houses the inner tube retractably along an axis of the inner tube, a drive mechanism that is attached to the column housing, and causes the inner tube to perform a retraction operation via a drive member that reciprocates along the axis, a first impact absorption member that is integrally provided on one of the drive member and the inner tube, and includes a deformation portion, and an action member that is provided on another of the drive member and the inner tube, acts on the deformation portion, and plastically deforms the deformation portion. The drive member, the first impact absorption member, and the action member are fixed to one another by a single fixing member. When a predetermined pushing load along the axis acts on the inner tube, fixing between the first impact absorption member and the action member is released.

In the steering device having this configuration, for example, when the predetermined pushing load acts on the inner tube upon a collision of a vehicle against another object, the inner tube retracts from the column housing, and the deformation portion of the first impact absorption member plastically becomes deformed by action of the action member. In this way, an impact such as strong push of a passenger against the steering wheel can be absorbed.

Particularly, in this configuration, the drive member, the first impact absorption member, and the action member are fixed by the single fixing member in order to acquire a normal usage state. Thus, the number of the fixing members is small, a structure is simple, and assemblability is excellent.

Further, in this configuration, the drive member, the first impact absorption member, and the action member are fixed by the single fixing member, and particularly, the drive member and the action member are fixed by the fixing member. Specifically, when the inner tube is caused to perform a retraction operation, bending rigidity of the first impact absorption member is not used, and a sense of unity of the column housing and the inner tube improves. Thus, the steering device having high rigidity can be acquired without depending on bending strength and the like of the first impact absorption member during a normal operation.

In the steering device according to this disclosure, a portion of the first impact absorption member being different from the deformation portion may be sandwiched between the drive member and the action member, and holding power may act on the drive member and the action member by the fixing member.

With this configuration, the column housing is reliably held in a vehicle during a normal use of the vehicle, and no particular external force acts on the deformation portion of the first impact absorption member. Thus, a deformation load set value of the deformation portion does not need to be considered upon attachment of the first impact absorption member, and the steering device having excellent mountability can be acquired.

In the steering device according to this disclosure, a fragile portion related to holding of the fixing member may be provided on the action member or the first impact absorption member in such a way that the action member or the first impact absorption member comes off the fixing member in a direction parallel to a pushing direction of the inner tube when the inner tube receives the predetermined pushing load.

By providing the fragile portion having this configuration, when predetermined impact force along the pushing direction acts on the inner tube, the fragile portion first functions, and fixing between the action member and the first impact absorption member is released prior to deformation of the deformation portion. By setting, as appropriate, a load for the fragile portion to function, an impact absorption characteristic can be set together with a subsequent plastic deformation capacity of the deformation portion. Providing such a fragile portion on the action member or the first impact absorption member does not require complicated processing or the like, and the steering device having a simple configuration and being compact can be acquired.

In the steering device according to this disclosure, a rivet may be used as the fixing member.

When the fixing member is the rivet, a structure of the fixing member itself is simplified, and a fastening operation is easy and inexpensive. Further, since the rivet itself is a small member, a space volume occupied by a connection portion of the drive mechanism and the inner tube is also extremely small. Thus, an application range of the steering device to which the first impact absorption member having this configuration can be attached can be extended.

In the steering device according to this disclosure, the action member may include a squeeze portion that plastically deforms the deformation portion, and a first gap may be formed between the squeeze portion and the deformation portion in a state where the predetermined pushing load does not act on the inner tube.

As in this configuration, by providing the first gap between the squeeze portion and the deformation portion, when the predetermined pushing load acts on the inner tube, a timing at which the fragile portion functions and a timing at which the first impact absorption member becomes deformed can be set different. Specifically, the fragile portion first functions, and fixing between the action member and the first impact absorption member is released. At this time, a certain amount of energy is absorbed while the action member and the first impact absorption member are relatively displaced. Next, the squeeze portion acts on the deformation portion, the deformation portion becomes bent and deformed, and the energy is further absorbed.

If both of the impact absorption functions occur simultaneously, a threshold value of energy needed for starting movement of the inner tube becomes a total of energy of both and becomes excessive. However, by providing a time difference in exhibition of the two impact absorption functions, a threshold value of energy needed for starting pushing movement of the inner tube at each timing is decreased, and the pushing movement of the inner tube successively occurs. As a result, instantaneous opposing force being received by a passenger from the steering wheel is reduced, and the safer steering device can be acquired.

In the steering device according to this disclosure, a second impact absorption member including an abutment portion configured to abut the first impact absorption member or a member to which the first impact absorption member is fixed, and a fitting portion being fit into a member on a side on which the action member is provided, when fixing between the first impact absorption member and the action member is released, may be provided, and the abutment portion or the fitting portion may be configured to be destroyed when fixing between the first impact absorption member and the action member is released.

With this configuration, the impact absorption capacity of the inner tube can be further increased by using energy required for destruction of the second impact absorption member.

In the steering device according to this disclosure, a second gap may be formed between the first impact absorption member and the abutment portion or between the member to which the first impact absorption member is fixed and the abutment portion in a state where the predetermined pushing load does not act on the inner tube.

By forming the second gap in this configuration, a timing at which a function of the fragile portion is exhibited and a timing at which an impact absorption function by the second impact absorption member is exhibited are easily set different. Further, depending on setting of the second gap, a timing at which the two impact absorption functions are exhibited and a timing at which plastic deformation of the deformation portion by the squeeze portion starts can also be set different. In this way, while increasing a total amount of energy absorption of the portion that exhibits each impact absorption function, the start of the movement of the inner tube at a timing at which each impact absorption function occurs can be facilitated, and instantaneous opposing force being received by a passenger can be reduced. Thus, the safer steering device can be acquired.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering device comprising:
an inner tube having an end portion to which a steering wheel of a vehicle is attached;
a column housing that houses the inner tube retractably along an axis of the inner tube;
a drive mechanism that is attached to the column housing, and causes the inner tube to perform a retraction operation via a drive member that reciprocates along the axis;
a first impact absorption member that is provided on one of the drive member and the inner tube, and includes a deformation portion; and
an action member that is provided on another of the drive member and the inner tube, acts on the deformation portion, and plastically deforms the deformation portion, wherein
the drive member, the first impact absorption member, and the action member are fixed to one another by a single fixing member, and, when a predetermined pushing load along the axis acts on the inner tube, fixing between the first impact absorption member and the action member is released.

2. The steering device according to claim 1, wherein
a portion of the first impact absorption member being different from the deformation portion is sandwiched between the drive member and the action member, and holding power acts on the drive member and the action member by the fixing member.

3. The steering device according to claim 1, wherein
a fragile portion related to holding of the fixing member is provided on the action member or the first impact absorption member in such a way that the action member or the first impact absorption member comes off the fixing member in a direction parallel to a pushing direction of the inner tube when the inner tube receives the predetermined pushing load.

4. The steering device according to claim 1, wherein
the fixing member is a rivet.

5. The steering device according to claim 1, wherein
the action member includes a squeeze portion that plastically deforms the deformation portion, and a first gap is formed between the squeeze portion and the deformation portion in a state where the predetermined pushing load does not act on the inner tube.

6. The steering device according to claim 1, further comprising
a second impact absorption member including an abutment portion configured to abut the first impact absorption member or a member to which the first impact absorption member is fixed, and a fitting portion being fit into a member on a side on which the action member is provided, when fixing between the first impact absorption member and the action member is released, wherein
the abutment portion or the fitting portion is configured to be destroyed when fixing between the first impact absorption member and the action member is released.

7. The steering device according to claim 6, wherein
a second gap is formed between the first impact absorption member and the abutment portion or between a member to which the first impact absorption member is fixed and the abutment portion in a state where the predetermined pushing load does not act on the inner tube.

* * * * *